United States Patent
Pyczak et al.

(10) Patent No.: US 7,108,817 B2
(45) Date of Patent: Sep. 19, 2006

(54) DIE, ESPECIALLY FOR EXTRUDING GREEN CERAMIC FOILS

(75) Inventors: Martin Pyczak, Ditzingen (DE);
Bettina Schmidt, Stuttgart (DE);
Jochen Gaenzle,
Leinfelden-Echterdingen (DE); Ulrich Eisele, Stuttgart (DE); Martin Schubert, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 145 days.

(21) Appl. No.: 10/257,240

(22) PCT Filed: Nov. 23, 2001

(86) PCT No.: PCT/DE01/04415

§ 371 (c)(1),
(2), (4) Date: Jun. 9, 2003

(87) PCT Pub. No.: WO02/064339

PCT Pub. Date: Aug. 22, 2002

(65) Prior Publication Data

US 2004/0026817 A1     Feb. 12, 2004

(30) Foreign Application Priority Data

Feb. 9, 2001   (DE) .................. 101 05 896

(51) Int. Cl.
*B29C 47/14*   (2006.01)
(52) U.S. Cl. ............. 264/177.11; 425/381; 425/382.4; 425/465; 425/466

(58) Field of Classification Search ............... 425/381, 425/382.4, 465, 466; 264/177.1, 177.11
See application file for complete search history.

(56) References Cited

U.S. PATENT DOCUMENTS

| | | | | |
|---|---|---|---|---|
| 3,377,655 A | * | 4/1968 | Kucharski et al. | 425/466 |
| 3,405,425 A | * | 10/1968 | Buckley et al. | 425/133.5 |
| 3,687,589 A | * | 8/1972 | Schrenk | 425/131.1 |
| 3,985,845 A | * | 10/1976 | Akatsuka et al. | 264/40.5 |
| 4,600,550 A | * | 7/1986 | Cloren | 264/173.13 |
| 4,731,004 A | * | 3/1988 | Wenz, Jr. | 425/133.5 |
| 5,679,383 A | * | 10/1997 | Ryan et al. | 425/141 |
| 6,106,268 A | | 8/2000 | Sechler et al. | 425/381 |

FOREIGN PATENT DOCUMENTS

DE    199 24 134    11/2000
JP    05 179 309     7/1993

* cited by examiner

*Primary Examiner*—Joseph S. Del Sole
(74) *Attorney, Agent, or Firm*—Kenyon & Kenyon LLP

(57) ABSTRACT

A die for producing flat sections, in particular a flat-sheet die for extrusion of ceramic green films, has a slot-shaped die outlet which opens in an outlet orifice. The height of the slot-shaped die outlet narrows beginning in the immediate vicinity of the outlet orifice and continuing to the outlet orifice. The die outlet is preferably formed by a first lip and a second lip situated opposite the first, having a constant first distance in at least some areas outside the immediate vicinity of the outlet orifice, and having at the outlet orifice a second smaller distance in comparison with the first distance, the first distance between the lips decreasing linearly to the second distance in the area of the immediate vicinity of the outlet orifice.

9 Claims, 1 Drawing Sheet

DIE, ESPECIALLY FOR EXTRUDING GREEN CERAMIC FOILS

FIELD OF THE INVENTION

The present invention relates to an extrusion die for producing flat sections, in particular a flat-sheet die for extrusion of ceramic green films.

BACKGROUND INFORMATION

An extrusion system having a flat-sheet die exhibiting a die design known from plastics technology is generally used for extrusion of polymer-bonded ceramic flat sections, i.e., films and green films. As shown in FIG. 1, such dies have an inlet, a distributor channel including a throttle field and a die outlet, i.e., a die relief having a variable gap height, i.e., a flex-lip, using which the thickness of the extruded flat sections is adjustable.

However, extrusion of ceramic sections in particular differs fundamentally from extrusion of plastics in two regards. First, the viscosity (i.e., the intrinsic viscosity in the case of intrinsically viscous substances, in which the viscosity depends on the shear rate) of extruded ceramic pastes is greater than that of plastics, and furthermore, a ceramic paste generally has a flow limit. In addition, in extrusion of flat ceramic sections, the fact that subsequent processing steps such as removal of binders or sintering may be very sensitive in their response to stresses frozen into the extruded flat sections should be taken into account.

FIG. 2 illustrates the flow velocity profile of a ceramic paste extruded through a conventional flat-sheet die in the outlet of the die for various viscosities of the extruded ceramic pastes, showing that the rate of flow is zero at the edges of the die and it is maximum at the center. The viscosity or intrinsic viscosity of the extruded ceramic paste is characterized by the flow exponent, which is defined by:

$$\dot{\gamma} = \Phi \tau^m$$

where $\dot{\gamma}$ is the gradient of the flow velocity, i.e., the shear rate in the extruded paste, $\Phi$ is the fluidity and $\tau$ is the shear stress. Accordingly, the following equation holds for the viscosity, i.e., intrinsic viscosity $\eta$ of the ceramic paste:

$$\eta = \Phi^{-\frac{1}{m}} \dot{\gamma}^{\left(\frac{1}{m}-1\right)}.$$

FIG. 2 shows that shear rate $\dot{\gamma}$ is zero at the center point of the die outlet and is maximum at the edge. The shear rate at the edge of the die is $\dot{\gamma}_w$. Shear rate $\dot{\gamma}_w$ at the wall is calculated as follows at a given volume throughput $\dot{V}$:

$$\dot{\gamma}_w = 2(m+2) \frac{\dot{V}}{H^2 B}$$

where m again denotes the flow exponent of the extruded paste and is thus a measure of the intrinsic viscosity of this paste, and H denotes the height of the flat-sheet die at the site in question and B is its width.

FIG. 2 shows in particular that, when there is a flow limit, i.e., a high flow exponent m, shearing of the extruded material occurs almost exclusively in the edge area of the die. In the case of extruded polymer-bonded ceramic pastes, this shearing produces an orientation of the binder molecules added to these pastes, which may result in considerable after-shrinkage of the extruded flat sections in the case of a downstream add-on processing used on the extruded flat sections, e.g., imprinting by screen printing or lamination. Since the degree of molecular orientation established in the extruded flat sections is not constant over the thickness of this film due to the differences in shear rates, such a post-shrinkage, i.e., relaxation which is associated with a macroscopic change in shape, cannot usually take place completely. Thus, in the past there have always been residual internal stresses, which are manifested as unwanted changes in geometry (shrinkage) in subsequent printing steps or lamination steps. In addition, delamination similar to puff pastry also frequently occurs near the film surfaces during a subsequent sintering.

SUMMARY OF THE INVENTION

An object of the present invention was to provide an extrusion die for producing flat sections which would avoid the aforementioned disadvantages and in particular would ensure a more homogeneous shear rate and a more homogeneous gradient of the molecular orientation over the thickness of the extruded flat sections.

The extrusion die according to the present invention for producing flat sections has the advantage over the related art that the flat sections produced with this die have a substantially reduced anisotropic shrinkage in a subsequent annealing in comparison with the related art. Furthermore, there is less post-shrinkage during subsequent imprinting steps or lamination. In addition, it is advantageous that due to the embodiment of the extrusion die according to the present invention, no flaky delamination is observable in sintering the flat sections produced in this way and no "chatter marks" occur due to stick-slip behavior, i.e., an uneven scaly surface of the extrudate caused by discontinuities in the flow curve in extrusion.

In addition, it is advantageous that apart from the modification of the extrusion die outlet according to the present invention, flat-sheet dies that are otherwise known from the related art may also be used for extrusion of ceramic green films or plastic films. Due to the fact that only the area of the die outlet in the immediate vicinity of the outlet orifice of the die is altered due to a particular geometric design, a die according to the present invention is much simpler to manufacture and may be integrated into existing or known extrusion systems. The cost of manufacturing the dies according to the present invention is therefore comparable to that of the known dies, and no significant investments in new extrusion systems are necessary.

It is particularly advantageous if the die outlet is formed by a first lip and a second lip situated opposite the first, having a constant first distance in at least some areas outside the immediate vicinity of the slot-shaped outlet orifice, and then having a second smaller distance in comparison with the first distance at the outlet orifice, the first distance in the area of the immediate vicinity of the outlet orifice narrowing linearly to the second distance. It is particularly advantageous if this linear narrowing from the first distance to the second distance takes place with an angle of inclination which is adapted to the flow exponent of the extruded ceramic paste.

BRIEF DESCRIPTION OF THE DRAWINGS

FIG. 4 illustrates the definition of angle of inclination a.

DETAILED DESCRIPTION

The present invention first relates to flat-sheet extrusion die 10 for extrusion of ceramic green films such as those known in principle from the related art. In particular, such a known flat-sheet die 10 according to FIG. 1 has an inlet for supplying the fluid substance coming out of an outlet orifice 13 and a downstream distributor channel having a throttle field opening into a die outlet 20, i.e., a die relief. A first lip 11 and a second lip 11' situated opposite the first are provided in this die outlet, initially spaced a distance of 1.5 mm apart, for example, then narrowing in front of outlet orifice 13 to a smaller second distance of 0.5 mm, for example, this second distance then remaining constant after narrowing until outlet orifice 13. To this extent, in the related art, according to FIG. 1, the distance of first lip 11 from second lip 11' is constant in the immediate vicinity of outlet orifice 13.

Figure 2:
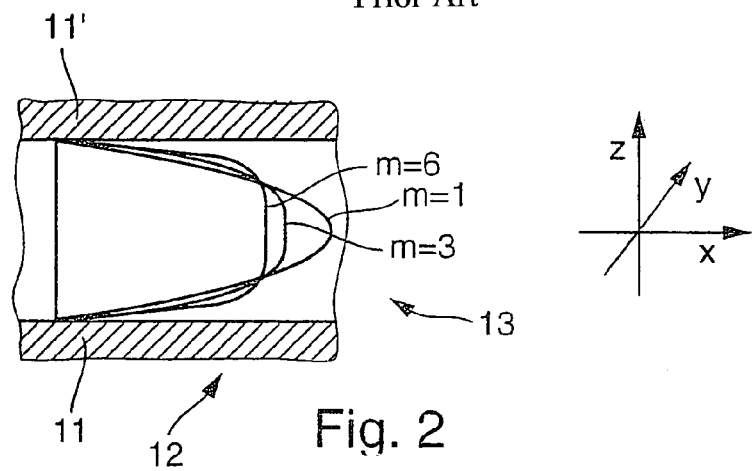
FIG. 2 shows the flow velocity profile of extruded pastes in the die outlet of the extrusion die according to FIG. 1 as a function of flow exponent m.

FIG. 2 shows the flow velocity profile of the ceramic paste in die outlet 20 in an area 12 which ends at outlet orifice 13, the flow velocity being plotted on the x axis and the height on the z axis. In particular, the flow velocity is zero at the walls of lips 11, 11'.

FIG. 2 shows that the gradient of the flow velocity, i.e., the shear rate in the paste, is particularly high in the vicinity of the walls, i.e., near the edges of die 10, i.e., lips 11, 11'. This effect is particularly pronounced in the case of pastes having a high flow exponent m, i.e., pastes having a flow limit.

Figure 1:
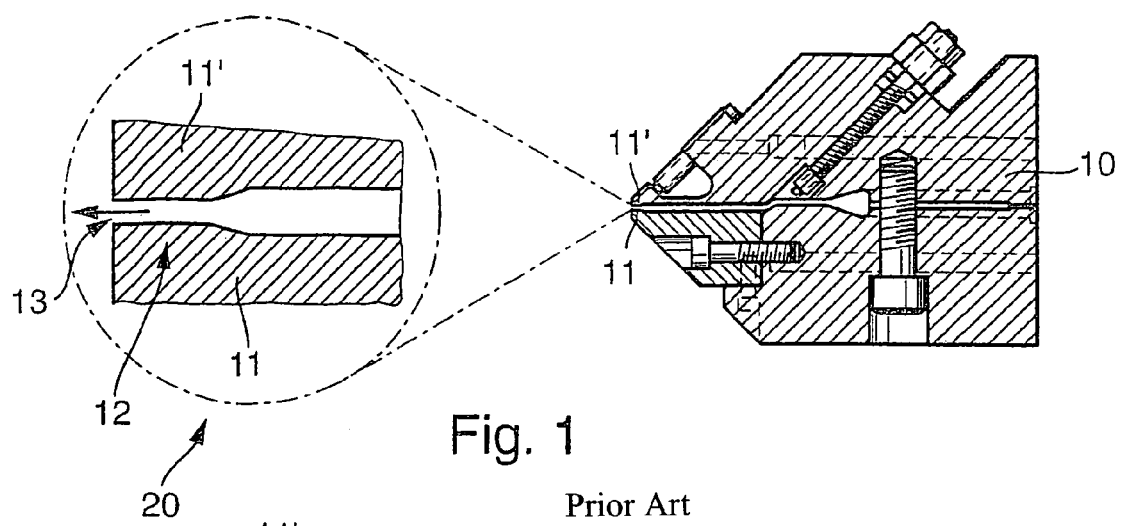
FIG. 1 shows a flat-sheet extrusion die known from the related art for extrusion of ceramic green films.
Figure 3:
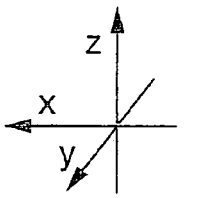
FIG. 3 shows a die relief according to the present invention of a flat-sheet die according to FIG. 1 in a sectional view.

In a modification of FIG. 1, FIG. 3 shows a die outlet 20 according to the present invention of a flat-sheet die for extrusion of ceramic green films, in particular polymer-bonded green films, having a first lip 11 and a second lip 11' opening into a slot-shaped outlet orifice 13. Die outlet 20 according to FIG. 3 differs from the one in FIG. 1 in that the height of slot-shaped die outlet 20 narrows continuously and linearly, beginning in an immediate vicinity 12' of slot-shaped outlet orifice 13 and continuing to slot-shaped outlet orifice 13. To this extent, lips 11, 11' are initially spaced a constant first distance $h_1$ apart, this distance narrowing linearly to second, smaller, distance $h_2$ in immediate vicinity 12' of outlet orifice 13.

In this way, die outlet 20 according to FIG. 1 having a long, plane-parallel die relief in area 12 of the ultimate gap height is replaced by a blade-like outlet of the die relief in a narrowed area which forms immediate vicinity 12' of outlet orifice 13. Blade-shaped narrowed area 12' directly in front of outlet orifice 13 thus results in the extruded flat sections not being shaped to desired thickness $h_2$ until directly in front of outlet orifice 13. Since the height of the die outlet, i.e., first distance $h_1$, is greater further upstream from this narrowing 12' than in area 12 according to FIG. 1, this results in a reduced maximum shear rate $\dot{\gamma}$ and thus a reduced shear rate gradient.

Due to blade-shaped narrowed area 12' in die outlet 20 according to FIG. 3, an elongation flow is superimposed on the shear flow there, likewise causing an orientation of polymer molecules or binder molecules contained in the polymer-bonded ceramic paste, for example, in the x direction; however, this elongation is homogeneous over the thickness of the film, i.e., homogeneous with respect to the z direction. In particular, the entire extruded paste then undergoes deformation, and regions which do not flow cannot form, as is the case with a shear flow due to the flow limit. Therefore, due to the die geometry according to the present invention, the gradient of the binder molecular orientation in the extruded flat sections is reduced.

Figure 4:
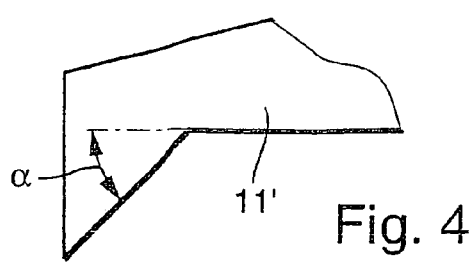

A particularly advantageous embodiment of the present invention provides that the linear narrowing from first distance $h_1$ to second distance $h_2$ takes place in narrowing area 12' having an angle of inclination a for which it is at least approximately true that:

$$\tan \alpha = m+2$$

where m is again the flow exponent of the paste, e.g., the ceramic polymer-bonded paste emerging through outlet orifice 13. The definition of a is also obtained from FIG. 4.

The choice of angle $\alpha$ explained here yields the result that the rate of elongation and the shear rate in die outlet 20 are of the same order of magnitude. In particular, this yields the results that the rate of elongation in blade-shaped narrowed area 12' is equal to the maximum shear rate, i.e., the shear rate at the wall.

It should also be pointed out that first distance $h_1$ between the two lips 11, 11' is between 250 μm and 40 mm, in particular 250 μm to 2 mm, and second distance $h_2$ at outlet orifice 13 is between 70 μm and 10 mm, in particular 70 μm to 1 mm. To this extent, the narrowing from first $h_1$ to second distance $h_2$ is usually established at a distance of 1 mm to 5 mm upstream from outlet orifice 13, depending on the settings of these values and the angle of inclination $\alpha$. This range defines narrowing area 12' in the immediate vicinity of slot-shaped outlet orifice 13. The width of flat-sheet die 10 may be up to 4 meters.

In conclusion, it should be emphasized that first distance $h_1$ and thus also second distance $h_2$ are adjustable variably in extrusion die 10 in a known manner.

What is claimed is:

1. A die for producing a flat section, comprising: a body including a slot-shaped die outlet that opens in an outlet orifice, wherein:
   a height of the slot-shaped die outlet narrows beginning in an immediate vicinity of the outlet orifice and continues to the outlet orifice, a narrowing of the height of the slot-shaped die outlet begins at a distance of 1 mm to 5 mm in front of the outlet orifice, and
   the narrowing of the height of the slot-shaped die outlet is a continuous narrowing.

2. The die as recited in claim 1, wherein:
   the die includes a flat-sheet die for extrusion of a ceramic green film.

3. The die as recited in claim 1, wherein:
   the slot-shaped die outlet is formed by a first lip and a second lip situated opposite the first lip outside the immediate vicinity of the outlet orifice,
   the first lip and the second lip are spaced apart at a constant first distance,
   at the outlet orifice, the first lip and the second lip are spaced apart at a second distance that is less than the first distance, and in a region in the immediate vicinity of the outlet orifice, the first distance decreases linearly to the second distance.

4. The die as recited in claim 3, wherein:

a linear narrowing from the first distance to the second distance occurs with an angle of inclination ($\alpha$) for which the equation $\tan \alpha = m + 2$ applies at least approximately, where m is a flow exponent of a fluid substance discharged through the outlet orifice.

5. The die as recited in claim 4, wherein:

the first distance is between 250 μm and 2000 μm, and the second distance is between 70 μm and 1000 μm.

6. The die as recited in claim 1, wherein:

the slot-shaped die outlet is in the shape of a blade in the immediate vicinity of the outlet orifice.

7. The die as recited in claim 3, wherein:

at least one of the first distance and the second distance is variably adjustable.

8. The die as recited in claim 1, wherein:

the body includes an inlet for supplying a fluid substance discharged through the outlet orifice, and the body includes a downstream distributor channel that has a throttle field and opens into the slot-shaped die outlet.

9. A method of using an extrusion die that includes a body provided with a slot-shaped die outlet that opens in an outlet orifice, a height of the slot-shaped die outlet narrowing beginning in an immediate vicinity of the outlet orifice and continuing to the outlet orifice, the method comprising:

using the extrusion die in an extrusion system for extrusion of one of polymer-bonded, ceramic flat sections and green films, wherein a narrowing of the height of the slot-shaped die outlet begins at a distance of 1 mm to 5 mm in front of the outlet orifice, and wherein the narrowing of the height of the slot-shaped die outlet is a continuous narrowing.

* * * * *